(12) United States Patent
Mondragon-Parra et al.

(10) Patent No.: US 7,347,786 B2
(45) Date of Patent: Mar. 25, 2008

(54) CROSS-STRAIGHT GROOVE JOINT

(75) Inventors: Eduardo R. Mondragon-Parra, Cuautitlan Izcalli (MX); Keith A. Kozlowski, El Paso, TX (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/730,309

(22) Filed: Dec. 8, 2003

(65) Prior Publication Data

US 2005/0124422 A1   Jun. 9, 2005

(51) Int. Cl.
*F16D 3/00* (2006.01)

(52) U.S. Cl. .................................. 464/144; 464/906

(58) Field of Classification Search ........ 464/144–146, 464/906
See application file for complete search history.

(56) References Cited

U.S. PATENT DOCUMENTS

| | | | |
|---|---|---|---|
| 1,916,442 A | 7/1933 | Rzeppa | |
| 1,975,758 A | 10/1934 | Stuber | |
| 2,322,570 A * | 6/1943 | Dodge | 464/144 |
| 3,002,364 A * | 10/1961 | Bellomo | 464/144 |
| 3,367,139 A | 2/1968 | Ristau | |
| 4,678,453 A | 7/1987 | Aucktor et al. | |
| 5,186,687 A | 2/1993 | Hayashi et al. | |
| 5,542,885 A | 8/1996 | Krude | |
| 5,616,081 A | 4/1997 | Krude | |
| 5,624,318 A | 4/1997 | Jacob et al. | |
| 5,685,777 A | 11/1997 | Schwarzler | |
| 5,813,917 A * | 9/1998 | Wakamatsu et al. | 464/906 |
| 5,853,328 A | 12/1998 | Kobayashi et al. | |
| 6,071,195 A * | 6/2000 | Krude | 464/144 |
| 6,227,979 B1 * | 5/2001 | Yamamoto et al. | 464/145 |
| 6,267,682 B1 | 7/2001 | Sone et al. | |
| 6,386,983 B1 | 5/2002 | Sone et al. | |
| 6,468,164 B2 | 10/2002 | Song | |

FOREIGN PATENT DOCUMENTS

| | | |
|---|---|---|
| DE | 38 18 730 C1 | 7/1989 |
| DE | 3818730 | 7/1989 |

* cited by examiner

*Primary Examiner*—Aaron Dunwoody
(74) *Attorney, Agent, or Firm*—Michael D. Smith

(57) ABSTRACT

The present invention provides a stroking ball-type constant velocity joint including a plurality of straight grooves and a plurality of cross grooves. The straight and cross grooves can be disposed along the interior of the joint in alternating fashion. For example, a cross groove passageway can be positioned between two straight groove passageways. The inner joint member can include helical grooves extending in a right-hand direction and in a left-hand direction. The helical grooves can be disposed in alternating fashion such that a left-handed groove is disposed between two right-handed grooves.

19 Claims, 4 Drawing Sheets

CROSS-STRAIGHT GROOVE JOINT

TECHNICAL FIELD

The invention relates to a stroking ball-type constant velocity joint, named Cross-Straight Joint and, more specifically, a constant velocity joint kinematically defined by longitudinal grooves and helical grooves for guiding movement of balls.

BACKGROUND OF THE INVENTION

A stroking ball-type constant velocity joint facilitates rotational movement between a driving shaft and a driven shaft. The stroking ball-type joint is especially useful in applications wherein the driving and driven shafts are angled with respect to one another. The stroking ball-type joint includes an inner joint member attached to one of the shafts and an outer joint member attached to the other shaft. The inner and outer joint members define grooves which cooperate to form passages. Roller balls are positioned in the passages and torque is transmitted between the shafts with the roller balls.

Stroking ball-type joints can include six-balls or eight-balls. Generally, six-ball stroking ball-type joints provide greater stroke and angle capabilities than eight-ball joints. On the other hand, eight-ball joints generally can be more compact than six-ball joints. It would be desirable to develop a stroking ball-type joint having the advantage of compactness provided by eight-ball joints with the stroke and angle capabilities of six-ball joints, at the same time NVH (Noise Vibration and Harshness) characteristics and mechanical efficiency are improved.

SUMMARY OF THE INVENTION

The present invention provides a stroking ball-type constant velocity joint including an inner joint member defining longitudinal grooves in combination with substantially helical grooves. The grooves are formed in an outer surface of the inner joint member. The grooves cooperate with corresponding grooves formed in an inner surface of an outer joint member. The longitudinal or straight grooves are disposed along the outer surface of the inner joint member in alternating relation with respect to the helical grooves. For example, a straight groove is positioned between two helical or inclined grooves. Furthermore, adjacent helical grooves are inclined or offset in opposite directions. For example, a first helical groove extends in a left-hand twist direction while a second, adjacent helical groove extends in a right-hand twist direction.

The helical or inclined grooves of the outer joint member cooperate with the helical grooves of the inner joint member to form cross groove passages. The inclined or cross groove passages create a constant velocity plane when the joint is angled. The degree of incline of the left-hand and right-hand grooves can be smaller than that of a standard 6-ball joint design. The straight or longitudinal grooves and cross grooves cooperate to allow a greater stroke than a joint that has inclined grooves. In addition, reduction of the helix angle of the helical grooves decreases the contact stresses in the grooves and the forces transmitted to a cage disposed between the inner and outer joint members.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
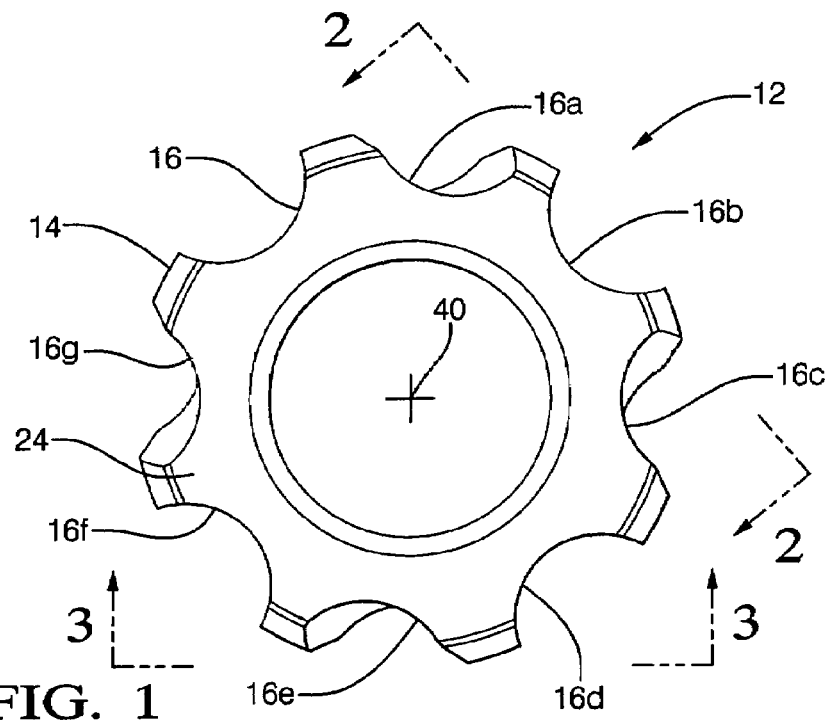
FIG. 1 is a front planar view of an inner joint member according to an embodiment of the invention.

The present invention provides a stroking ball-type constant velocity joint 10 including an inner joint member 12 having an outer surface 14 defining a plurality of radially outwardly facing grooves 16, 16a, 16b, 16c, 16d, 16e, 16f, 16g. The plurality of radially outwardly facing grooves 16, 16a, 16b, 16c, 16d, 16e, 16f, 16g include substantially longitudinal grooves 16, 16b, 16d, 16f in combination with substantially helical grooves 16a, 16c, 16e, 16g. The inner joint member 12 can also include a first end 24 and a second end 26, the grooves 16-16g can extend between the first end 24 and the second end 26.

Figure 2:
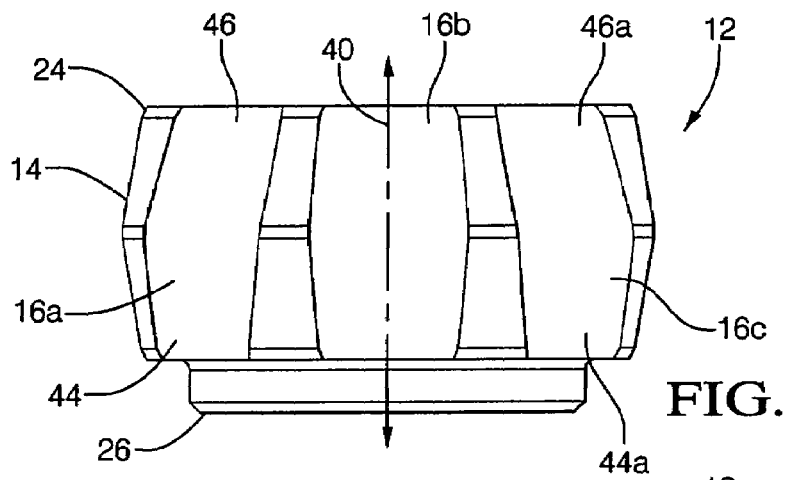
FIG. 2 is a side planar view of the inner joint member shown in FIG. 1.
Figure 3:
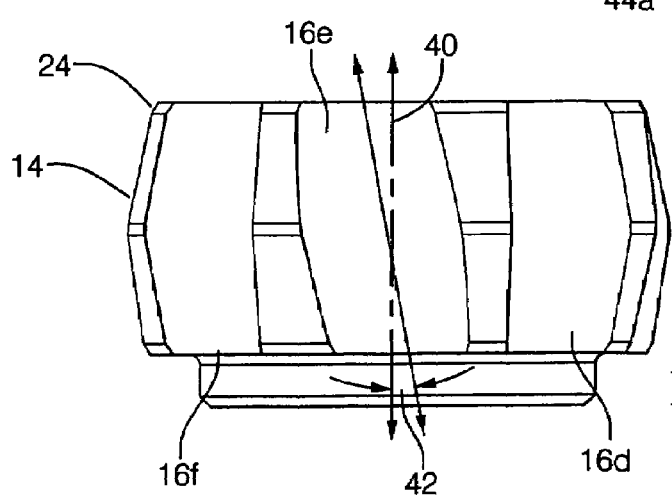
FIG. 3 is a bottom planar view of the inner joint member shown in FIG. 1.

The longitudinal grooves 16, 16b, 16d, 16f extend substantially parallel to a longitudinal axis 40 of the inner joint member 12, between the first and second ends 24, 26, the longitudinal axis 40 being centered with respect to the inner joint member 12 as shown by FIGS. 1-3. The inner joint member 12 can include four substantially longitudinal grooves 16, 16b, 16d, 16f disposed along the outer surface 14 ninety degrees (90°) from one another.

The helical grooves 16a, 16c, 16e, 16g extend between the first and second ends 24, 26 offset or inclined at an angle 42 with respect to the axis 40. The inner joint member 12 includes helical grooves 16a, 16c, 16e, 16g, each one extending in an opposite rotational direction relative to the circumferentially adjacent one. For example, as shown in FIGS. 2 and 3, the helical groove 16a extends from the second end 26 to the first end 24 at an angle 42 offset with respect to the axis 40. A first end 44 of the groove 16a is spaced further from the groove 16b than a second end 46 of the groove 16a. One of ordinary skill in the art would characterize the groove 16a in inner joint member 12 as having a left-hand twist or being a left-hand groove. The groove 16e is located diametrically opposite the groove 16a on inner joint member 12 and also has a left-hand twist. The groove 16e extends between the first and second ends 24, 26, curving in the same rotational direction as the groove 16a does.

Each of the grooves 16c and 16g extends between the first and second ends 24, 26 at an angle 42 relative to the axis 40, but in an opposite rotational direction relative to the grooves 16a and 16e. As shown in FIG. 2, the first end 44a of the groove 16c is spaced further from the groove 16b than the second end 46a of the groove 16c. One of ordinary skill in the art would characterize the grooves 16c and 16g in inner joint member 12 as having a right-hand twist or being right-hand grooves.

As shown in FIGS. 1-3, each of the helical grooves 16a, 16c, 16e, 16g extends along the outer surface 14 between two longitudinal grooves 16, 16b, 16d, 16f. For example, the helical groove 16a extends between the grooves 16 and 16b. In addition, the grooves 16-16g can be disposed about the outer surface 14 in alternating relation, such that each of the helical grooves 16a, 16c, 16e, 16g is located between two other helical grooves that extend in opposite direction. For example, left-hand helical groove 16a is located between right-hand grooves 16c and 16g. Thus, as shown in FIG. 1, the circumferential sequence of grooves 16-16g is as follows (proceeding clockwise): longitudinal groove 16; left-hand groove 16a; longitudinal groove 16b; right-hand groove 16c; longitudinal groove 16d; left-hand groove 16e; longitudinal groove 16f; and right-hand groove 16g. As FIG. 1 illustrates, left-hand twist helical grooves 16a and 16e are located on diametrically or directly opposite sides of inner joint member longitudinal axis 40, and right-hand twist helical grooves 16c and 16g are located on diametrically or directly opposite sides of inner joint member longitudinal axis 40.

The joint 10 also includes a plurality of balls 18, 18a, 18b, 18c, 18d, 18e, 18f, 18g. The balls 18-18g are individually disposed in corresponding grooves 16-16g. In operation, the balls 18-18g are moveable along the grooves 16-16g between the first and second ends 24, 26. By way of example only, the balls 18-18g can have a diameter d. Furthermore, a diameter defined by the centers of the plurality of balls 18-18g disposed in the grooves 16-16g can be D, where D is n times bigger than d.

Figure 10:
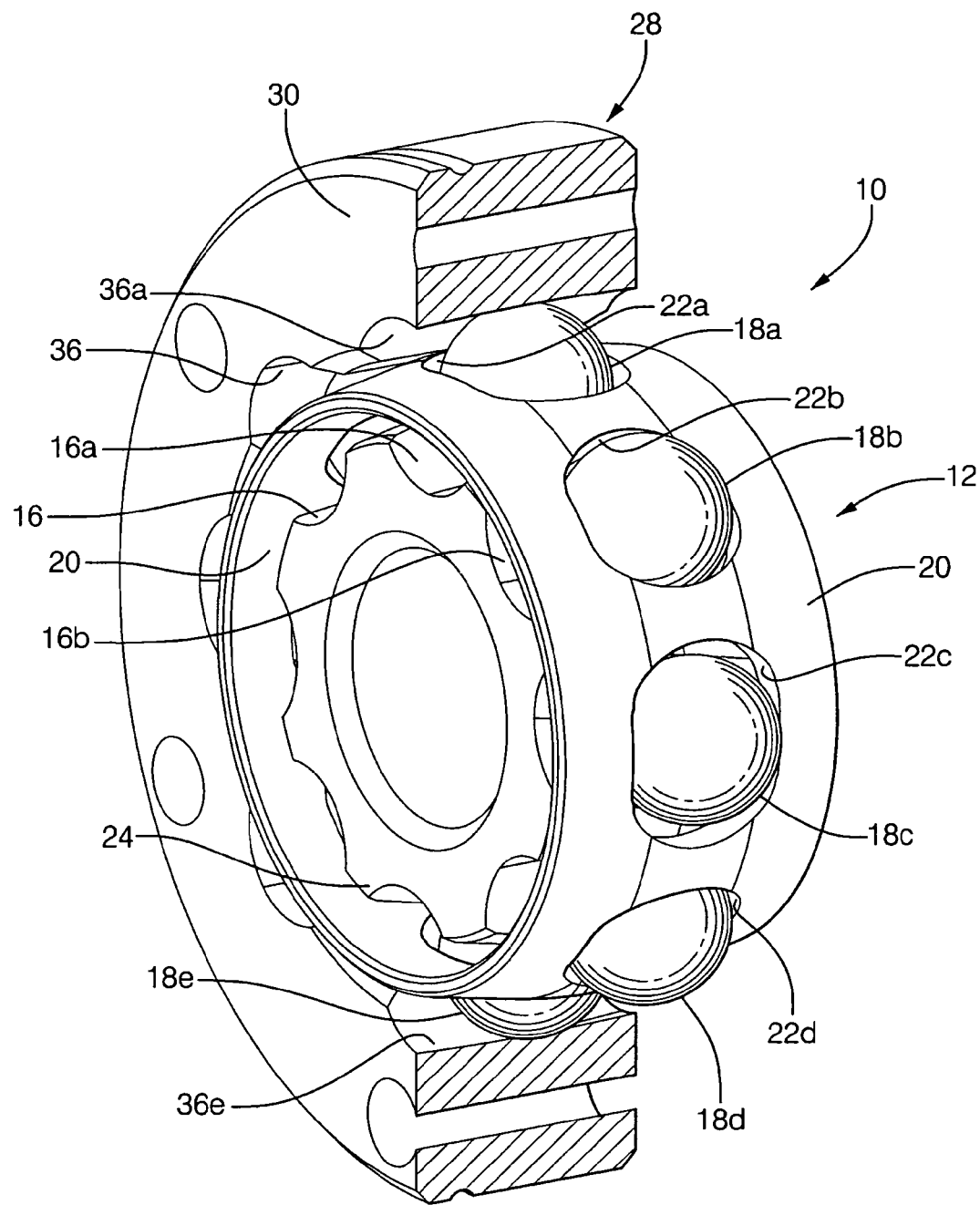
FIG. 10 is a perspective, cross-sectional view of the joint assembly shown in FIG. 7.

The joint 10 also includes a cage 20 surrounding the inner joint member 12. The cage 20 defines a plurality of windows 22, 22a, 22b, 22c, 22d, 22e, 22f, 22g. Each of the windows 22-22g is disposed adjacent to a corresponding groove 16-16g. Each of the plurality of balls 18-18g is disposed in a respective window 22-22g and balls 18-18g are retained in the grooves 16-16g by the cage 20. The windows 22-22g include a plurality of short windows 22, 22b, 22d, 22f and a plurality of long windows 22a, 22c, 22e, 22g. The short windows are positioned adjacent the longitudinal grooves 16, 16b, 16d, 16f. The long windows 22a, 22c, 22e, 22g are positioned adjacent the helical grooves 16a, 16c, 16e, 16g. As shown in FIG. 10, a long window such as long window 22c is circumferentially wider than a short window such as short window 22b. The axial width of the short and long windows 22-22g are the same.

Figure 4:
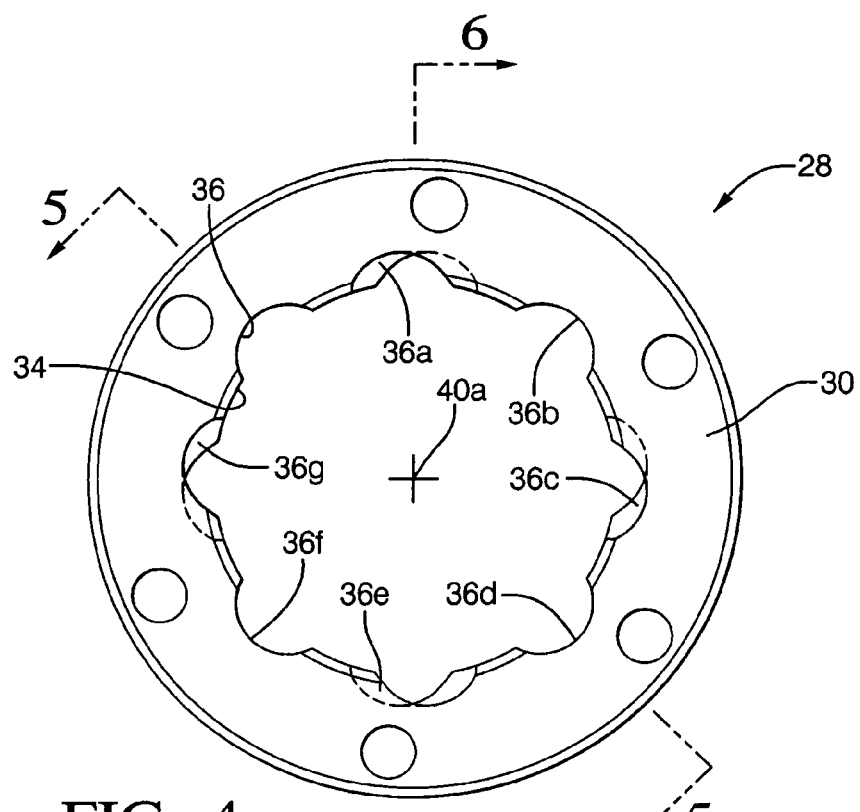
FIG. 4 is a front planar view of an outer joint member according to an embodiment of the invention.
Figure 5:
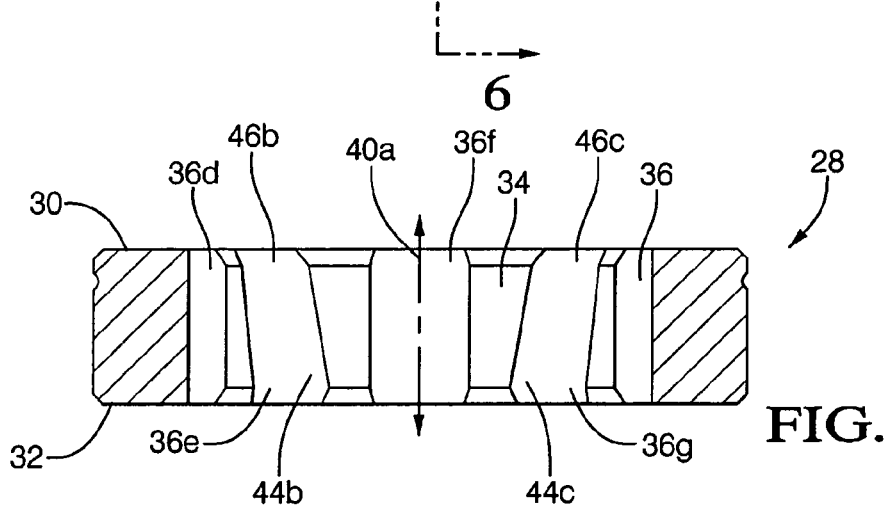
FIG. 5 is a first cross-sectional view of the outer joint member shown in FIG. 4.
Figure 6:
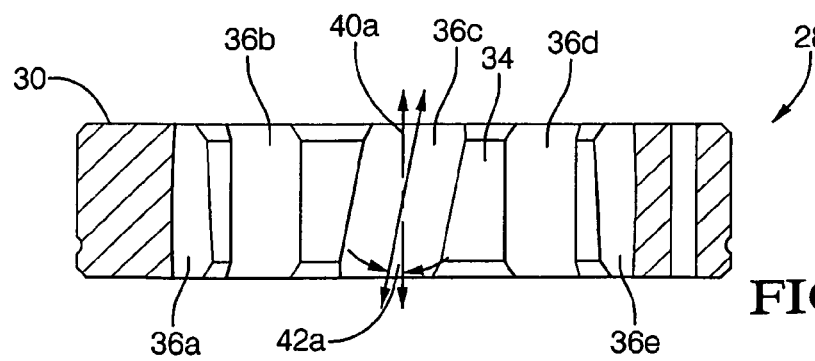
FIG. 6 is a second cross-sectional view of the outer joint member shown in FIG. 4.

Referring now to FIGS. 4-6, the joint 10 also includes an outer joint member 28. The outer joint member 28 surrounds the cage 20 and the inner joint member 12. The outer joint member 28 extends axially between a third end 30 and a fourth end 32. The outer joint member 28 includes an inner surface 34 defining a plurality of radially inwardly facing grooves 36, 36a, 36b, 36c, 36d, 36e, 36f, 36g extending between the third and fourth ends 30, 32.

The inwardly facing grooves 36-36g include longitudinal grooves 36, 36b, 36d, 36f and helical grooves 36a, 36c, 36e, 36g. The longitudinal grooves 36, 36b, 36d, 36f extend substantially parallel to a longitudinal axis 40a of the outer joint member 28, between the third and fourth ends 30, 32, the longitudinal axis 40a being centered with respect to the outer joint member 28 as shown by FIGS. 4-6. The outer joint member 28 includes four substantially longitudinal grooves 36, 36b, 36d, 36f disposed along the inner surface 34 ninety degrees (90°) from one another.

The helical grooves 36a, 36c, 36e, 36g extend between the third and fourth ends 30, 32 offset or inclined at an angle 42a with respect to the axis 40a. The outer joint member 28 includes helical grooves 36a, 36c, 36e, 36g, each one extending in an opposite rotational direction relative to the circumferentially adjacent one. For example, as shown in FIGS. 5 and 6, the helical groove 36e extends from the third end 30 to the fourth end 32 at an angle 42a offset with respect to the axis 40a. A second end 46b of the groove 36e is spaced further from the groove 36f than a first end 44b of the groove 36e. One of ordinary skill in the art would characterize the groove 36e in outer joint member 28 as having a right-hand twist or being a right-hand groove. The groove 36a is located diametrically opposite the groove 36e on outer joint member 28 and also has a right-hand twist. The groove 36e extends between the third and fourth ends 30, 32, curving in the same rotational direction as the groove 36e does.

Each of the grooves 36c and 36g extends between the third and fourth ends 30, 32 at an angle 42a relative to the axis 40a, but in an opposite rotational direction relative to the grooves 36a and 36e. As shown in FIG. 5, the first end 44c of the groove 36g is spaced closer to the groove 36f than the second end 46c of the groove 36g. One of ordinary skill in the art would characterize the grooves 36c and 36g in outer joint member 28 as having a left-hand twist or being left-hand grooves.

As shown in FIGS. 4-6, each one of the helical grooves 36a, 36c, 36e, 36g extends along the inner surface 34 between two of the longitudinal grooves 36, 36b, 36d, 36f. For example, the helical groove 36a extends between the longitudinal grooves 36 and 36b. In addition, the grooves 36-36g can be disposed about the inner surface 34 in alternating relation, such that each of the helical grooves 36a, 36c, 36e, 36g is located between two other helical grooves that extend in an opposite direction. For example, the right-hand helical groove 36a is located between the left-hand grooves 36c and 36g. Thus, as shown in FIG. 4, the circumferential sequence of grooves 36-36g is as follows (proceeding clockwise): longitudinal groove 36; right-hand groove 36a; longitudinal groove 36b; left-hand groove 36c; longitudinal groove 36d; right-hand groove 36e; longitudinal groove 36f; and left-hand groove 36g.

Figure 7:
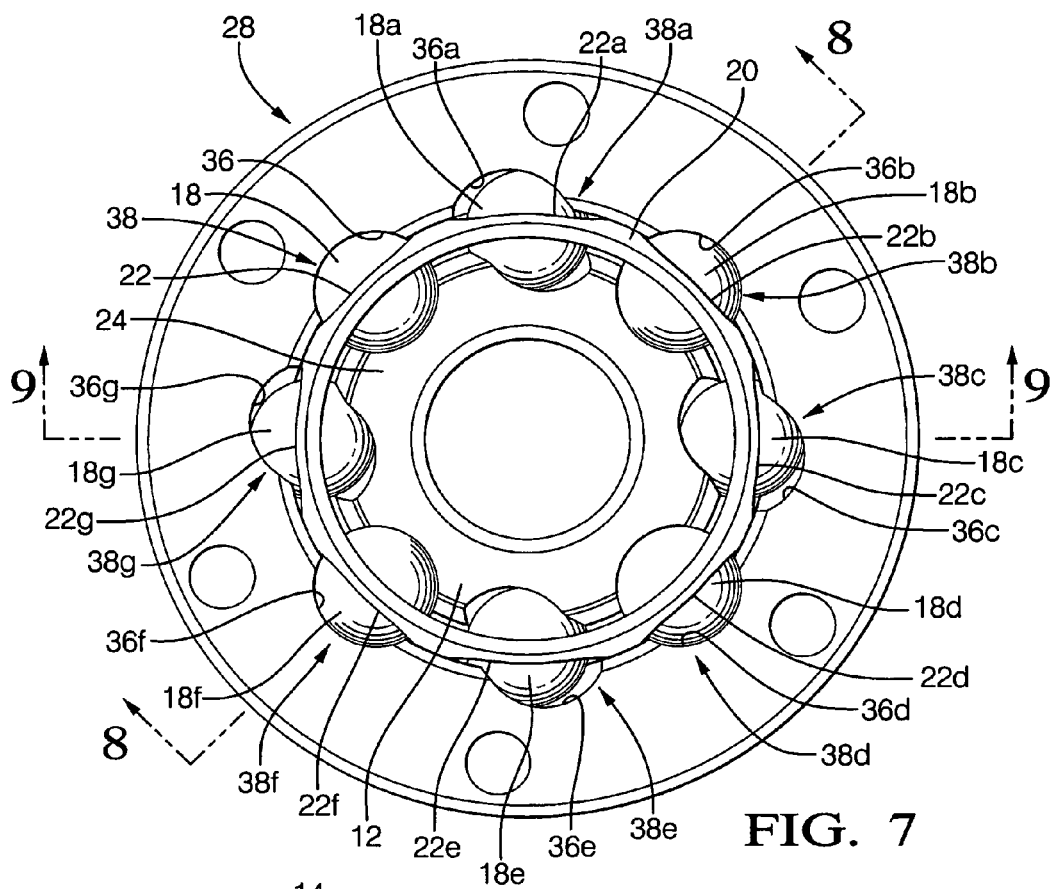
FIG. 7 is a front planar view of a joint assembly according to an embodiment of the invention including the inner joint member shown in FIGS. 1-3 and the outer joint member shown in FIGS. 4-6.
Figure 8:
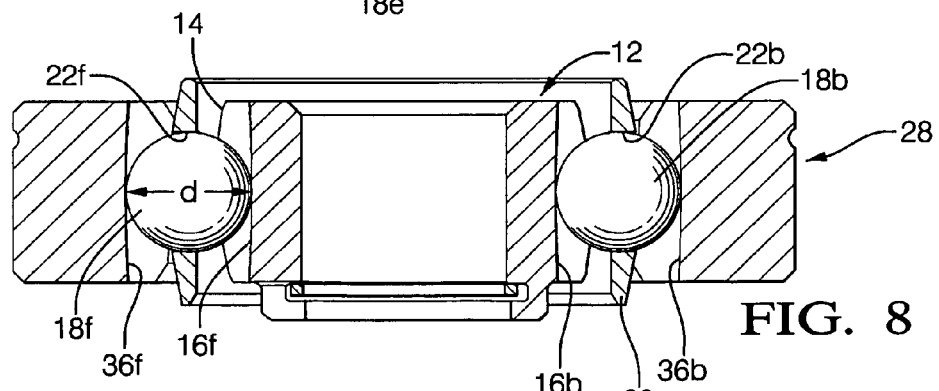
FIG. 8 is a first cross-sectional view of the joint assembly shown in FIG. 7.
Figure 9:
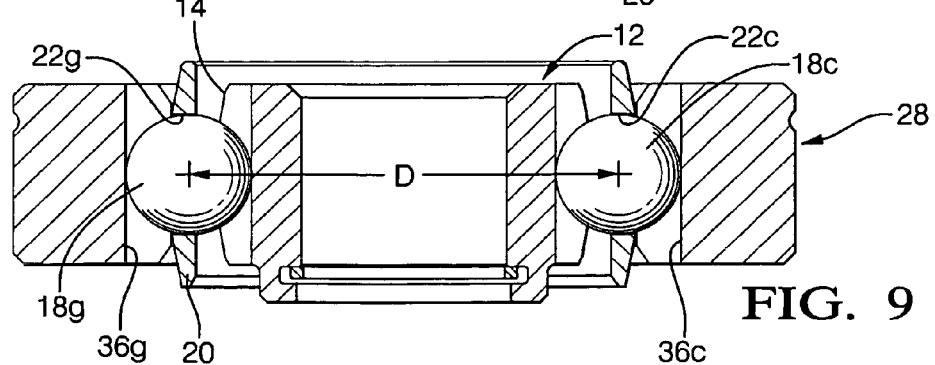
FIG. 9 is a second cross-sectional view of the joint assembly shown in FIG. 7.

The helical grooves 16a, 16c, 16e, 16g of the inner joint member 12 individually cooperate with the helical grooves 36a, 36c, 36e, 36g, respectively, of the outer joint member 28 to form cross groove passages 38a, 38c, 38e, 38g. Cross groove passages are discussed in greater detail in U.S. Pat. No. 6,468,164, which is hereby incorporated by reference. For example, the left-hand groove 16a of inner joint member 12 is inclined with respect to the axis 40 of the inner joint member 12 to the same degree that the right-hand groove 36a of outer joint member 28 is inclined to the axis 40a of the outer joint member 28. However, the grooves 16a and 38a extend in opposite left and right-hand twist directions such that they cross one another, as can be readily understood with reference to FIG. 7.

The joint assembly 10 according to the invention can have an angle capacity X and a stroke capacity Y. The joint assembly 10 is more compact than a six-ball joint having similar stroke and angle capabilities. The joint assembly 10 has greater stroke and angle capabilities than previous eight-ball joints having similar size. Furthermore, the NVH characteristics and efficiency are better than equivalent six-ball joints.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A stroking ball-type constant velocity joint comprising:
    an inner joint member having a longitudinal axis centered with respect to said inner joint member and an outer surface defining a plurality of radially outwardly facing substantially longitudinal grooves in combination with a plurality of radially outwardly facing substantially helical grooves, said plurality of longitudinal grooves including at least one pair of substantially straight grooves extending substantially in parallel with said inner joint member longitudinal axis, said grooves of each said pair of longitudinal grooves being located on opposite sides of said inner joint member longitudinal axis, said plurality of helical grooves including at least one pair of right-hand twist grooves and at least one pair of left-hand twist grooves, the grooves of each said pair of right-hand twist grooves being located on diametrically opposite sides of said inner joint member longitudinal axis, the grooves of each said pair of left-hand twist grooves being located on diametrically opposite sides of said inner joint member longitudinal axis;
    an outer joint member having an inner surface disposed about said inner joint member outer surface, said outer joint member inner surface having a plurality of radially inwardly facing grooves defined in said inner surface; and
    a plurality of balls disposed between said inner and outer joint members, a ball of said plurality of balls disposed in each said inner joint member radially outwardly facing groove and in a corresponding one of said outer joint member radially inwardly facing grooves, torque transmission between said inner and outer joint members being through said balls.

2. The stroking ball-type constant velocity joint of claim 1 wherein said outer joint member has a longitudinal axis centered with respect to said outer joint member and said plurality of radially inwardly facing grooves includes a plurality of inwardly facing substantially longitudinal grooves in combination with a plurality of radially inwardly facing substantially helical grooves, said plurality of inwardly facing longitudinal grooves including at least one pair of substantially straight grooves extending substantially in parallel with said outer joint member longitudinal axis, said grooves of each said pair of radially inwardly facing longitudinal grooves being located on opposite sides of said outer joint member longitudinal axis, said plurality of radially inwardly facing helical grooves including at least one pair of right-hand twist grooves and at least one pair of left-hand twist grooves, the grooves of each said pair of radially inwardly facing right-hand twist grooves being located on opposite sides of said outer joint member longitudinal axis, the grooves of each said pair of radially inwardly facing left-hand twist grooves being located on opposite sides of said outer joint member longitudinal axis; and
    wherein each said pair of radially outwardly facing longitudinal grooves is engaged with a said pair of radially inwardly facing longitudinal grooves through a pair of said balls.

3. The stroking ball-type constant velocity joint of claim 1, wherein each of said substantially helical grooves is located between two of said substantially longitudinal grooves.

4. The stroking ball-type constant velocity joint of claim 1 wherein said substantially helical grooves and said substantially longitudinal grooves are disposed in alternating relation along said outer surface of said inner joint member.

5. The stroking ball-type constant velocity joint of claim 1, wherein a first helical groove is located between second and third helical grooves, said second and third helical grooves extending in an opposite rotational direction relative to said first helical groove.

6. The stroking ball-type constant velocity joint of claim 1 wherein said plurality of radially outwardly facing grooves includes eight grooves.

7. A stroking ball-type constant velocity joint comprising:
    an inner joint member having a longitudinal axis centered with respect to said inner joint member and an outer surface defining a plurality of radially outwardly facing longitudinal grooves in combination with a plurality of radially outwardly facing substantially helical grooves, wherein each said helical groove curves in the same rotational direction as a corresponding helical groove disposed on a diametrically opposite side of said longitudinal axis does, said plurality of radially outwardly facing substantially helical grooves including a pair of right-hand grooves and a pair of left-hand grooves; and
    a plurality of balls individually disposed in and movable along said plurality of radially outwardly facing substantially helical grooves; and
    an outer joint member having an inner surface defining a plurality of radially inwardly facing substantially helical grooves wherein said plurality of radially outwardly facing substantially helical grooves of said inner joint member cooperate with said plurality of radially inwardly facing substantially helical grooves of said outer joint member forming a plurality of passages guiding movement of said plurality of balls and wherein said plurality of balls transmit torque between said inner joint member and said outer joint member.

8. The stroking ball-type constant velocity joint of claim 7, wherein said inner joint member includes a first end and a second end, and said grooves of said plurality of radially outwardly facing grooves extend from said first end to said second end and include four substantially longitudinal grooves located along said outer surface at ninety degrees from one another and four substantially helical grooves individually located along said outer surface and between two of said four substantially longitudinal grooves, and wherein each of said substantially helical grooves extends in an opposite rotational direction relative to the rotational direction in which the two helical grooves adjacent thereto extend.

9. A stroking ball-type constant velocity joint comprising:
an inner joint member having a longitudinal axis centered with respect to said inner joint member and a first end and a second end and an outer surface defining a plurality of radially outwardly facing grooves extending from said first end to said second end including four substantially longitudinal grooves disposed along said outer surface ninety degrees from one another and four substantially helical grooves, each helical groove disposed along said outer surface between two of said four substantially longitudinal grooves, two of said helical grooves extending in a right-hand rotational direction and disposed on diametrically opposite sides of said longitudinal axis, two of said helical grooves extending in a left-hand rotational direction and disposed on diametrically opposite sides of said longitudinal axis;
a plurality of balls individually disposed in and movable along said plurality of radially outwardly facing grooves;
a cage surrounding said inner joint member and defining a plurality of windows wherein each of said plurality of balls is individually disposed in one of said plurality of windows, said plurality of windows including short windows adjacent said substantially longitudinal grooves and long windows adjacent said substantially helical grooves; and
an outer joint member surrounding said cage and having a third end and a fourth end and an inner surface defining a plurality of radially inwardly facing grooves extending from said third end to said fourth end including four substantially longitudinal grooves disposed along said inner surface ninety degrees from one another and four substantially helical grooves individually disposed along said inner surface between two of said four substantially longitudinal grooves and wherein said plurality of outwardly facing grooves of said inner joint member cooperate with said plurality of inwardly facing grooves of said outer joint member forming a plurality of passages guiding movement of said plurality of balls.

10. The stroking ball-type constant velocity joint of claim 9 wherein said substantially helical grooves and said substantially longitudinal grooves are disposed in alternating relation along said outer surface of said inner joint member.

11. The stroking ball-type constant velocity joint of claim 9 wherein each of said helical grooves of said inner joint member and each of said helical grooves of said outer joint member extends in opposite relation to two adjacent helical grooves.

12. The stroking ball-type constant velocity joint of claim 9, wherein at least one of said plurality of passages is defined by a first helical groove of said inner joint member and a second helical groove of said outer joint member, and wherein said first and second helical grooves extend in opposite rotational directions relative to one another.

13. The stroking ball-type constant velocity joint of claim 6 wherein said inner joint member is further defined as having four longitudinal grooves spaced substantially ninety degrees apart from one another about said centered longitudinal axis.

14. The stroking ball-type constant velocity joint of claim 13 wherein said plurality of radially outwardly facing substantially helical grooves is further defined as including two right-hand helical grooves spaced substantially one hundred and eighty degrees apart from one another about said centered longitudinal axis.

15. The stroking ball-type constant velocity joint of claim 14 wherein said plurality of radially outwardly facing substantially helical grooves is further defined as including two left-hand helical grooves spaced substantially one hundred and eighty degrees apart from one another about said centered longitudinal axis.

16. The stroking ball-type constant velocity joint of claim 15 wherein each of said two left-hand helical grooves is spaced substantially ninety degrees apart from each of said two right-hand grooves about said centered longitudinal axis.

17. The stroking ball-type constant velocity joint of claim 1 wherein said plurality of radially outwardly facing substantially helical grooves is further defined as including the same number of left-hand grooves and right-hand grooves.

18. The stroking ball-type constant velocity joint of claim 7 further comprising:
a cage surrounding said inner joint member and defining a plurality of windows wherein each of said plurality of balls individually is disposed in one of said plurality of windows, said plurality of windows including short windows adjacent said substantially longitudinal grooves and long windows adjacent said substantially helical grooves.

19. The stroking ball-type constant velocity joint of claim 2, wherein a said pair of radially outwardly facing right-hand twist grooves are engaged with a said pair of radially inwardly facing left-hand twist grooves through a pair of said balls, and a said pair of radially outwardly facing left-hand twist grooves are engaged with a said pair of radially inwardly facing right-hand twist grooves through a pair of said balls.

* * * * *